United States Patent

Brender et al.

[15] 3,638,195

[45] Jan. 25, 1972

[54] DIGITAL COMMUNICATION INTERFACE

[72] Inventors: Ronald F. Brender; John L. Foy, Jr., both of Ann Arbor, Mich.

[73] Assignee: The Battelle Development Corporation, Columbus, Ohio

[22] Filed: Apr. 13, 1970

[21] Appl. No.: 27,940

Related U.S. Application Data

[63] Continuation-in-part of Ser. No. 835,072, June 20, 1969, abandoned.

[52] U.S. Cl. .......... 340/172.5
[51] Int. Cl. .......... G06f 3/00
[58] Field of Search .......... 340/172.5

[56] References Cited

UNITED STATES PATENTS

| | | | |
|---|---|---|---|
| 3,312,953 | 4/1967 | Wang et al. | 340/172.5 |
| 3,350,689 | 10/1967 | Underhill et al. | 340/172.5 |
| 3,461,432 | 8/1969 | Keiter et al. | 340/172.5 |
| 3,469,085 | 9/1969 | Asada et al. | 340/172.5 |
| 3,496,550 | 2/1970 | Schachner | 340/172.5 |

*Primary Examiner*—Raulfe B. Zache
*Assistant Examiner*—Harvey E. Springborn
*Attorney*—Sughrue, Rothwell, Mion, Zinn & Macpeak

[57] ABSTRACT

The digital communication interface facilitates the transfer of blocks of data between the memories of two computers and provides for maximum data density of information storage when the two computers involved have different word sizes. Once initialized, the interface transfers data via cycle-steal with respect to the two computers' memories. Either computer may detect the status of the interface at any time during a data transfer and can halt or modify the operation as desired. When a transfer operation has been completed, the interface can signal either or both computers. The interface includes a data register which is divided into two sections. The number of bits in each section corresponds to the number of bits in the memory word of each of the two computers. Thus, if the two computers have different word sizes, the two sections of the data register will have different lengths. The data register is a circular bidirectional shift register which provides a parallel-to-serial-to-parallel data path. The operation of the interface during data-transfers is completely controlled by registers internal to itself which can be loaded by either computer. The condition of the data-handling circuits is indicated at all times by these registers which can also be read by either computer. This allows the interface to be commanded fully by either computer or by both. The control registers are capable of controlling the unit size of contiguous groups of data words transferred between the memories of the two computers such that the unit size may be either the least common multiple of the word size of each of the two computers or the smaller of the two word sizes. In the latter case a word-for-word relationship is maintained, whereas this is not true in the former case. The former case, however, permits high-density packing of the data from the memory of one computer to the memory of the second computer. The control registers are also capable of independently varying the effective length of each section of the data register. This permits data from one section to be introduced into the other at any bit position.

4 Claims, 4 Drawing Figures

PATENTED JAN 25 1972

3,638,195

SHEET 1 OF 2

INVENTORS
R. F. BRENDER
J. L. FOY, JR.

BY

Sughrue, Rothwell, Mion, Zinn & Macpeak
ATTORNEYS

DIGITAL COMMUNICATION INTERFACE

CROSS-REFERENCE TO RELATED APPLICATION

This application is a continuation-in-part of application Ser. No. 835,072, filed June 20, 1969, by R. F. Brender and J. L. Foy, Jr., entitled "Digital Communication Interface," now abandoned.

BACKGROUND OF THE INVENTION

1. Field of the Invention

This invention relates generally to data processing systems, and more particularly to a digital communication interface which has the capability of transferring blocks of data between the memories of two data processors, such as computers. The invention is particularly useful in multiple computer systems where flexible control of data density and format is required.

2. Description of the Prior Art

Previous methods of interfacing two computers have usually involved some combination of the following procedures:

a. Each computer is provided with registers or data paths by which it can present a word or character of data to the other machine and signal that it had done so, possibly by causing an interruption in the recipient machine. The latter can then read this word or character and interpret it according to some convention. Often the same path is used for both control information and "true" data. This process can be repeated indefinitely for the transfer of blocks of data or to cause intricate control sequences to be performed. To avoid problems of contention, the conflict arising when both machines attempt to send data at the same time, it is common practice to provide two data paths, one in each direction.

b. Many modern computers employ deices known as data channels to control the flow of data between main memory and external devices. A data channel contains an address register and usually also a word count register. To transfer data to an external device, the computer's central processing unit must load the channel address register with the memory address of the block of contiguous data words, load the channel (or device) word count register with the number of words in that block, and then start the channel. The data channel proceeds to transfer words from the designated block of memory to the external device or from the external device to the designated block of memory. Meanwhile, the central processing unit is free to do additional computations without needing to attend to the details of the transfer. When the requisite number of words has been transferred, the data channel signals the central processing unit (often via an interruption) that it is finished and that further operations may be initiated if desired.

It will be observed that the above descriptions refer to a computer's communication with external devices. When two computers are to be connected together, past practice has had each computer treat the other as an external input/output device. Commonly, a data channel of one is connected to a data channel of the other and then, in order for a transfer to take place, each machine must initialize its data channel with address and count information and start the channels reading into memory or writing out of memory, as appropriate. This means that before any block transfers can occur, both machines must cooperate in taking care of the preliminaries. Thus, it is usually necessary to provide data paths as described under procedure (a) above for the exchange of information needed to set up channel operations as described under procedure (b).

Although, in general, these procedures have performed satisfactorily in the past, they have not been found to be entirely suitable in applications wherein fast and flexible communication between two computers is a major requirement. For example, procedure (a) described above provides a way of transferring data from one machine to another that is simple in terms of hardware (the number and complexity of logical circuits). However, its use requires a substantial amount of central processing unit time (many memory cycles) be devoted for each word transferred. It is necessary for the sending computer to know when the other computer has read the data so that the other word can be sent. Even in cases where interrupt signals are provided by the interface control circuitry for this purpose, the time required to identify which of the many possible interrupts has occurred and then to take action to send another word is considerable. As a result, the number of words that can be transferred per unit time interval (the transfer rate) is substantially below that possible with data channels.

Note, also, that with this procedure, both commands and data are transferred over the same path. There is the danger that one machine will lose track of whether the current word is supposed to be used as a command to initiate some new action or is a piece of data needed as a result of some previously initiated command.

In short, the transfer rate is slow and the active cooperation of both machines over substantial proportions of their computing time is required.

The second procedure described above can provide transfer rates which approach the maximum possible rate for moving data to or from whichever machine is the slower. But it still requires substantial effort and cooperation by both machines to establish the transfer. In addition, there are several possible logical errors that can develop that have very undesirable effects on performance of the two systems. For example, both data channels may be started so that each is attempting to write at the other or each is attempting to read from the other. On the other hand, one data channel may be given a word count that is larger than the others. Under these circumstances, that computer will never receive the termination signal since its data channel cannot finish.

Each of these and other problems can be checked against by special hardware for that purpose or by detailed checking by the programs that control the interface. But this adds to the cost of the interface and/or to the computer time and memory de;icated to monitoring and controlling it.

SUMMARY OF THE INVENTION

It is, therefore, an object of the present invention to provide a digital communication interface which facilitates the transfer of blocks of data from the memory of one computer to the memory of another computer whereby the data transfer is implemented by state-of-the-art hardware which requires a minumum of attention from the central processing units of the two computers, as opposed to data transfer methods implemented mainly by software.

It is another object of this invention to provide a digital communication interface having unusual flexibility in providing for maximum data density of information storage when the two computers involved have different word sizes.

It is a further object of the invention to provide an interface between two digital computers which allows simpler control programs than those where cooperation is required for the transfer of data, and less time is spent by both computers in servicing the needs of the interface.

It is yet another object of the invention to provide a digital communication interface wherein when one computer has prior knowledge of the desired source or destination of the data in the other computer, it can completely initiate the data transfer without interrupting the activity of the other computer.

It is yet another object of the invention to provide a digital interface which is substantially faster than prior procedures, thereby permitting high-speed interactive processing between computers.

It is still another object of the invention to provide a digital communication interface wherein the effective lengths of the data words transferred between two computers may be independently varied.

According to one form of the present invention, the foregoing and other objects are attained by providing a data register controlled by a plurality of control registers. The data register is a circular shift register divided into two sections. The number of bits in each section corresponds to the number of bits in the memory word of each of the two computers. If the two computers have different word sizes, the two halves of the data register will be of different lengths. Each half of the data register may be loaded or unloaded independently, in parallel, to or from the input/output bus of the respective computer, and the data register is capable of shifting its contents either left or right. The control registers comprise shift count registers and frame size registers, a count register, address registers, and a status register. The shift count registers control the effective word size, or frame size. These registers are not directly addressable by either computer. The shift count registers count the shifts of the data in the data register. The frame size registers control the effective lengths of the separate halves of the data register and are used to initialize the values of the respective shift count registers. The frame size registers are initially loaded by one or both of the computers with the desired frame sizes. It is necessary that data be transferred from one computer to the other in a block of words. This is accomplished under the control of the count register which is initially loaded with the number of units of data to be transferred. The count register is decremented by one each time a unit of data has been transferred, as indicated by the two shift count registers containing zero at the same time. When the count register contains zero, the data transfer is completed. The two address registers control the addresses for their respective computers to which or from which data will be written or read. The status register is a logical entity that need not be implemented of homogeneous components. It is accurate to describe the status register as a collection of bits which reflects the condition of various flip-flops and gates within the interface. All of these bits are available to be read by either computer. Some of these bits may be set and/or cleared when the status register is loaded from either or both computers and others may not. For example, the status register contains such information as whether either computer is to receive the completion signal when a data transfer is completed. These bits may be set or cleared by either computer to control the behavior of the interface. The bit which indicates whether the interface is currently "busy" with a transfer cannot be set or cleared directly by either computer, since it reflects the instantaneous physical state of the interface.

BRIEF DESCRIPTION OF THE DRAWING

The specific nature of the invention, as well as other objects, aspects, uses and advantages thereof, will clearly appear from the following description and from the accompanying drawing, in which.

DESCRIPTION OF THE PREFERRED EMBODIMENT

Certain constructional details of the interface are determined by the engineering details of the two computers and whether or not a data link is required between the two computers. These constructional details provide for differences in logic levels, error detection, and the like. The engineering of these features of the interface is straightforward and not considered to be a part of the invention; therefore, it will not be considered further in this description.

Figure 1:
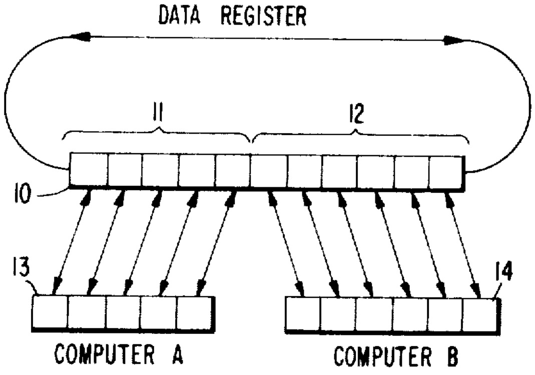
FIG. 1 is a simplified block diagram of the data register used in the interface.

Referring now to the drawing wherein like reference numerals designate identical or corresponding parts throughout the several views, and more particularly to FIG. 1, there is shown a simplified block diagram of the data register 10 which accomplishes the efficient transfer of data between two data processors, such as computers A and B. Basically, the data register 10 is a circular shift register divided into two sections 11 and 12, the number of bits in each section corresponding to the number of bits in the memory word of each of the two computers. The gating between the bits of the data register 10 is such that the effective length of each of sections 11 and 12 may be varied independently. Thus, for example, data in section 12 may be shifted to the right and introduced into section 11 at any bit position whereupon it will be shifted successively to the right. If the two computers have different word sizes, the two halves of the data register will have different lengths. The data register is capable of shifting (rotating) its contents either to the left or to the right. The two halves 11 and 12 of the data register 10 may be loaded or unloaded independently, in parallel, to or from the input/output buses 13 and 14 of each of the respective computers A and B. For example, suppose we have two computers A and B which have memory word sizes of five and six bits, respectively. If it is desired to pass the data from the memory of computer A (five-bit word) into the memory of computer B (six-bit word), this can be done, completely filling the memory words of computer B. The first word from computer A is loaded in parallel into section 11 of the data register 10 from input/output bus 13. The data are then shifted right five steps, at which time section 11 is empty, which stops the shift. A second word is then loaded into section 11. The shift right is then continued, stopping one step later because section 12 of the data register 10 is full. The contents of section 12 are then unloaded in parallel into the memory of computer B via input/output bus 14. The shift right is continued for four more steps, at which time section 11 is again empty. A third word is loaded into section 11 of the data register 10 from computer A, and the process continues. The data are transferred in contiguous groups of words hereafter called "unit." A unit always consists of an integral number of words in each computer memory. The number of bits transferred in a unit is equal to the number of bits which is equal to the least common multiple of the frame sizes of the two computers, as described later. In the example above, this would be 30 bits (six words from computer A's memory exactly fill five words of computer B's memory).

Figure 4:
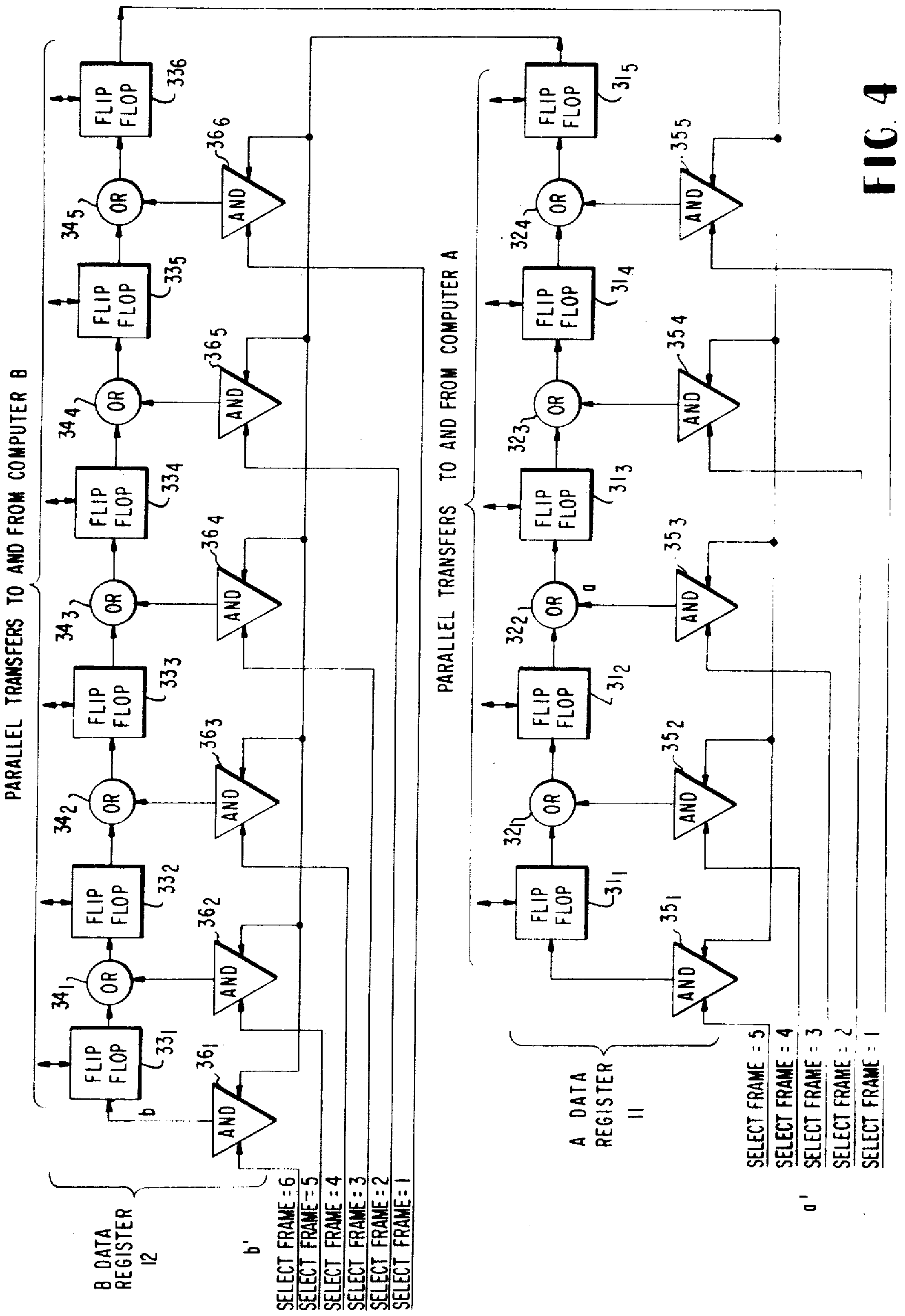
FIG. 4 is a simplified logic diagram illustrating the means by which the two halves of the data register may be given effective lengths determined by the corresponding frame size registers.

In the above example, a word-for-word relationship is not maintained. This presents no problem if computer A is to retrieve the data at a later time with no processing required by computer B. The retrieval process, which is the mirror image of the above example, restores the word relationship in computer A's memory. Note that for correct retrieval, the data must rotate through the data register 10 in the same direction as in the original transfer. This latter requirement implied further that to return the data to the original bit positions within the word, rather than left-adjusted to the high-order part of the word, data register 10 must have provision for having an effective size as determined by the frame size registers, discussed below. A means for accomplishing this is illustrated in FIG. 4. If computer B is to process the transferred data, however, it would either have to have prior knowledge of the structure of the data in its memory or, alternatively, a word-for-word relationship can be maintained at the price of unused bits in computer B's memory. Another example will illustrate this. A word from computer A's memory is loaded into section 11 of the data register 10. The data are shifted left five steps. The word is now contained in section 12 with the highest order bit unused. Section 12 of the data register 10 is then unloaded into computer B's memory and section 12 of the data register is zeroed. At the same time, the next word from computer A's memory is loaded into section 11. The process is continued until all the required data has been transferred. The unit length, in this case, is five bits, and six words from computer A's memory would occupy six words in computer B's memory, rather than the five words of the previous example. Thus, a word-for-word data transfer will have been accomplished. For a word-for-word transfer of data from computer B's memory to computer A's memory, either the highest or the lowest order bit in computer B's memory words will have to be discarded. This is accomplished by shifting either left or right five steps.

Figure 2:
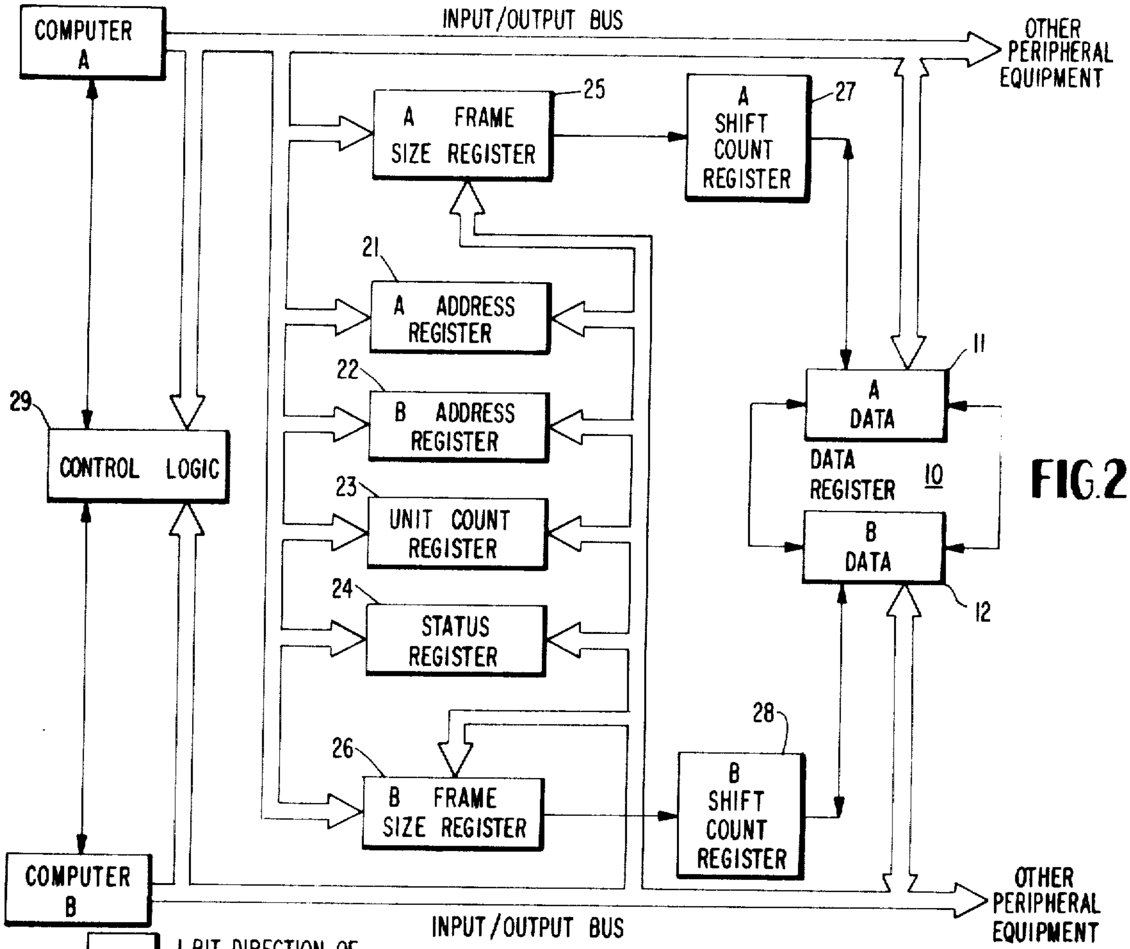
FIG. 2 is a block diagram of the digital communication interface according to the invention showing data flow and control functions.

The principle of operation of the control registers is described with reference to FIG. 2, which is a block diagram of the entire interface. Eight control registers are essential to the operation of the interface: these are A address register 21, the B address register 22, the unit count register 23, the status register 24, the A frame size register 25, the B frame size register 26, the A shift count register 27 and the B shift count register 28. The first six of these registers are individually addressable by either computer A or computer B. They are capable of being read by either computer, and may also be loaded by either computer (except for certain bits in the status register which reflect conditions of the interface not directly controllable by the external machines).

The shift count registers 27 and 28 control the effective word size, or "size." These registers are not directly addressable by either computer. The shift count registers count the shifts of the data in the data register 10, the A counter 27 for section 11 and the B counter 28 for section 12. As in the first example given above, five-bit words from computer A's memory are to be packed into the six-bit words of computer B's memory. Counter 27 is initially loaded with five from the corresponding frame size register 25, and counter 28 is similarly loaded with six from its frame size register 26. With each shift of the data in the data register 10, counters 27 and 28 are decremented by one. After five shifts, shift count register 27 contains zero, which indicates that all the data have been transferred from section 11 to section 12 of data register 10. The shifting is stopped, section 11 of the data register is loaded again, and shift count register 27 again loaded with five from its frame size register 25. After one more shift, shift count register 28 contains zero. This shift is again stopped, section 12 is unloaded in parallel into computer B's memory, and shift count register 28 is again loaded with six from its frame size register 26. The process continues. When a unit of data has been transferred, both shift count registers 27 and 28 will contain zero at the same time. Detection of this condition is simple and is used as an indication of the completion of a unit transfer.

The frame size registers 25 and 27 are initially loaded by one or both of the computers with the desired frame sizes. In the example just presented, this would be five and six, respectively. If a word-for-word relationship is required, the frame size registers would be initially loaded with five and five, respectively. It is obvious that other combinations are possible to satisfy various data transfer requirements.

To further detail the role of the frame size registers 25 and 27 in controlling a transfer, reference is made to FIG. 4 which shows the logic that controls the effective length of the data register 10. As shown therein, section 11 of the data register is composed of flip-flops or shift register stages $31_1$ to $31_5$ serially interconnected by OR-gates $32_1$ to $32_4$. In a similar manner, section 12 is composed of flip-flops $33_1$ to $33_6$ serially interconnected by OR-gates $34_1$ to $34_5$. The input to section 11 is selectively controlled by AND-gates $35_1$ to $35_5$ connected to each bit position of that section. Thus, each AND-gate $35_1$ to $35_5$ has as one input the data line from flip-flop $33_6$ and as the other input the control input from its corresponding frame size register 25. AND-gates $36_1$ to $36_6$ are connected to each bit position of section 12 and selectively control the input thereto. Each of AND-gates $36_1$ to $36_6$ has as one input the data line from flip-flop $31_5$ and as the other input the control input from its corresponding frame size register 27. It should be noted here that the logic shown in FIG. 4 has been simplified for purposes of illustration only, and while the logic shown is for one shift direction, the preferred embodiment contemplates bidirectional shifting.

Suppose that in the computers of the previous example, a data transfer was desired from computer A to computer B with the A frame size register 25 containing the value 3 and the B frame size register 27 containing the value 6. The values of the frame size registers are decoded to provide a logical signal enabling one of the frame select lines for each section of the data register. For this example, the lines labeled *a'* and *b'* shown in FIG. 4 would have logical one values and the others logical zeros.

As bits are shifted out of the low order bit portion of section 11, they enter section 12 at the point labeled *b*. Clearly, three bits from each of two computer A words will combine to form one computer B word, with the first three bits in the low order part of the computer B word. When the data is returned to computer A under the same frame conditions, bits leaving the low order bit of section 12 enter section 11 at point *a*. After three shifts, the first group of three bits is transferred to computer A memory; and three shifts later, the second group is transferred, thereby restoring the original word and bit arrangement of the transferred data.

The "start" command which begins the transfer of data between computers A and B initially clears the whole data register 10 to zero, thereby assuring that no extraneous one's are shifted into active parts of the data register from inactive parts regardless of frame size values. Similar conditions apply to shifting in the opposite direction out of the high-order bit of each data register; however, the example illustrated wherein shifting is in only one direction may satisfy many applications and is a special case of the preferred embodiment.

Returning now to FIG. 3 of the drawings, it is necessary that data be transferred from one computer to the other in a block of words, as described above. The unit count register 23 is initially loaded with a number of units of data to be transferred. The unit count register is decremented by one each time a unit of data has been transferred, as indicated by the two shift count registers 27 and 28 containing zero at the same time. When the unit count register 23 contains zero, the data transfer is complete.

The two address registers 21 and 22 control the addresses for their respective computers to which or from which data will be written or read. For a data transfer from computer A to computer B, the A address register 21 will initially contain the starting address of the data in computer A's memory. The B address register 22 will initially contain the starting address in computer B's memory into which the data are to be written. Each time a word is transferred from computer A's memory into section 11 of the data register 10, the A address register 21 is incremented by one. Similarly, each time a word is transferred from section 12 of the data register 10 into computer B's memory, the B address register 22 is incremented by one. The transfer of data from computer B back into computer A is the mirror image of this process as described above; i.e., the retransfer is on a first-in, first-out basis with the data shifted in the same direction as in the original transfer. For example, if the original transfer was by shifting the data to the right from computer A to computer B, the retransfer must be by shifting to the right or a rotation in a counterclockwise direction. Under these circumstances, address registers 21 and 22 are incremented by one for each transfer between the data register 10 and the respective memories of computers A and B as in the original transfer. For completeness, it should be noted that an alternate method of implementing the reverse of a given data transfer would be to effect an exact inverse of the process originally used on a first-in, last-out basis. This means starting each of address registers 21 and 22 at the last word of each computer's data block and decrementing for each memory access. In this case, the direction of shifting is opposite to that of the original transfer. This has the potential advantage of reducing the number of frame select lines required, and in the special case where one computer has a fixed frame size, no select lines are required at all on its section of the data register.

The status register 24 reflects the conditions of the various flip-flops and gates within the interface. All of the bits stored in the status register 24 are available to be read by either computer, and some of these bits may be set and/or cleared when the status register is loaded from either or both computers, and others may not. For example, the status register 24 contains such information as whether either computer is to receive a completion signal when a data transfer is completed. These bits are set or cleared by either computer to control the behavior of the interface. The bit which indicates whether the interface is currently "busy" with a transfer cannot be set or cleared directly by either computer, since it reflects the instantaneous physical state of the interface.

The following is a summary of the control information provided in the status register 24:

a. Interface seized by computer A.
b. Interface seized by computer B.
c. Interface busy (data transfer in progress).
d. Operation complete (unit count register has become zero).
e. Enable computer A interruption upon operation complete.
f. Enable computer B interruption upon operation complete.
g. Direction of desired data transmission.
h. Exception or hardware error conditions.
i. Attention code.
j. Direction of data shift.

Figure 3:
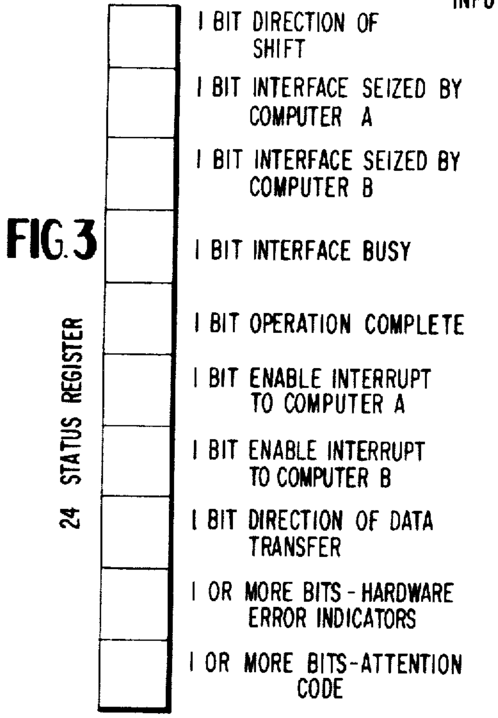
FIG. 3 is a diagrammatic illustration of the status register of the digital communication interface shown in FIG. 2.

Each of the foregoing is indicated by one or more bits in the status register 24 as illustrated by FIG. 3 of the drawing.

This information is used as follows: The two "seized" bits are used by the two computers' software together with the Test and Seize command to resolve simultaneous attempts by both computers to command the interface. One or the other or neither, but not both of these bits may be set to indicate which computer, if either, has control. In one form of the invention these bits are not used to inhibit the ability of either computer to perform any command, as will be clear in later examples.

The interface bus bit will be set by a start command and cleared either by the stop command or the completion of the data transfer. The latter condition will also set the operation complete bit.

The enable bits are used to gate the operation complete bit to provide an interruption signal to the respective computers.

The control circuits 29 of the interface are able to accept a number of commands, which may be issued by either computer under program control. Most of these commands affect the control registers or other control circuitry; "start," "stop," and "blast" will also affect the data-handling circuits. The following is a list of the commands which the interface recognizes, with a short description of each:

a. Test and seize—examines the status register and sets or does not set the appropriate "seized" bit depending on whether the interface is available or in use by the other computer (includes provision for resolution of simultaneous attempts by both computers to "seize" the interface).
b. Write register—allows any of the control registers (except the shift count registers) to be loaded with data from the computer issuing the command.
c. Read register—allows the computer issuing the command to read any of the control registers (except the shift count registers).
d. Start—begins memory-to-memory data transfer as specified by the control registers.
e. Stop—halts current memory-to-memory transfer at the end of the current unit transfer.
f. Blast—immediately resets all control circuits and registers, and immediately halts any transmission operation.
g. Attention—generates an "attention" interruption in the other computer.

The control circuits 29 have two principal functions:

1. to cause the interface to respond as a standard I/O device to commands issued by either computer under program control, and
2. to control the transfer of data word between the two halves of the data register 10 and the memories of the respective computer.

The details of these control circuits will depend on such characteristics of the computers A and B as:

a. their speed of operation;
b. the number and nature of signals provided to and expected from external devices;
c. the possible multiplexing of control information and data on the same I/0 bus; and
d. the method of requesting direct transfers to and from the computers' memories.

If the conventions and procedures employed by computer A differ from those of computer B, then the portion of the interface control circuits connected to the former must operate differently from that connected to the latter.

One possible internal structure of the interface employs a common bus connected to all the control registers and to two buffer registers, one for each computer. Each computer then communicates directly with its respective buffer register, but only indirectly with the control register; the control circuits 29 direct the transfer of data to and from the control registers and the buffer registers via the common bus.

The interface control circuits 29 must be able to respond to simultaneous and asynchronous control commands from both computers. One implementation accomplishes this by dividing the function of the interface into two distinct alternating phases: a "computer A phase" and a "computer B phase." During "computer A phase" the interface processes a portion of any instruction outstanding from computer A, and during "-computer B phase" it handles portions of computer B instructions. This procedure not only guarantees rapid response to commands from either computer by "time-sharing" the control circuits, but also simplifies the test-and-seize operation by providing a clear distinction between the periods in which the computers A and B have access to the status register 24.

In order to set up a data transfer, one of the computers (by convention) seizes the interface for its use. Then it leads the A and B address registers 21 and 22 with appropriate addresses, loads the unit count register 23 with the length of the data block, sets the bits of the status register 24 to indicate direction of transmission and handling of operation-complete interruption. Depending on specific implementations, the frame size registers 25 and 26 might be directly loadable or might be specified implicitly by bits in the status register 24. Then the computer issues a start command and the transfer commences.

The attention command proves a mechanism for either computer to signal the other that some action is requested of it. This facility may be used in many ways. Consider the following example:

Computer B has data to be sent to a disk storage device attached to computer A. Computer B, after seizing the interface, loads the B address and count registers 22 and 23, respectively, and also loads the desired disk memory address into the A address register 21. It then gives an attention command to computer A. What is required is some means to specify to computer A that a particular interpretation is to be given to the content of the A address register 21. Computer A must save the A address content for later use, then load the A register 21 with the memory address of an available buffer region and start the data transfer.

The use of a separate register as an attention code register makes cooperative initialization such as this considerably simpler, although the basic registers can be used if more elaborate control procedures are employed. Such an additional register provides a signal path for synchronizing intricate control sequences between the two computers. It also provides a separate signal path that can be used in parallel with on-going data transfers.

The interface, as described above, has simple and unusually flexible control characteristics and allows for a wide range of computer interaction. In cases where one computer has prior knowledge of the desired source or destination of information in the other computer, it can completely initiate the data transfer without interrupting the activity of the other computer. This allows simpler control programs than those where cooperation is required, and requires less time by both machines in servicing the needs of the interface. The design provides for maximum density of information storage when different-sized words are involved in the two computers. Further, since all the registers of the device can be loaded or read by both machines, they can be used to pass more than one word at a time when the interface is used in a simple "single word" mode.

The following example describes a possible computer interaction that cannot be achieved with the usual methods. Suppose that computer A is sending a block of data to computer B. Suppose, further, that computer B has some information for computer A that is of higher priority nature than that currently being transferred. The computer B machine may opt to stop the current transmission in midstream, to read into its memory the contents of the interface registers, load those registers with the control data needed for the desired, high-priority transfer and cause that transfer to take place.

When completed, the computer B machine reloads the interface registers with their contents at the time it was stopped and restarts the previous transfer. Since the completion signal provided by the interface is under control of the control registers, the transfer performed by computer B need not interrupt computer A. Computer A will, however, be signaled when its own transfer is completed if it is so desired. Thus, computer A need not even be aware that the computer B transfer took place except for the change in its memory that was the result. Indeed, computer A could interrupt its own transfer in a similar manner if its own transfer in a similar manner if it were warranted. Of course, a certain amount of computer time is required to carry out these actions, but where a large block is being transferred that will take a relatively long time to finish, it is potentially very valuable to have this option.

The logical structure of the digital communication interface is more important than the details of hardware. Such items as registers, counters, gates, etc., are well-known components of digital apparatus of all sorts and may be constructed in increasingly diverse ways as technology advances. The interface could be made of integrated-circuit modules available from commercial suppliers, it could also be made of discrete components, or possibly of one single integrated circuit. Several variations are possible in the logical structure of the interface, as appropriate to the application for which it is to used. For example, the frame-size registers 25 and 26 might not be arbitrarily variable, or the capacity of each computer to command the interface might be made dependent on the condition of the conflict-resolution circuits, i.e., the test and seize bits, so that only one computer could control the interface at a time, or the starting of any data transfer might be made dependent on the receipt of "start" signals from both computers so that active cooperation between them would be enforced, and so forth.

It will, therefore, be apparent that the embodiment shown is only exemplary and that various modifications can be made in construction and arrangement within the scope of the invention as defined in the appended claims.

What is claimed is:

1. A digital communication interface to facilitate the transfer of blocks of data between the memories of a first data processor and a second data processor, said first processor having a word length of *m* bits and said second processor having a word length of *n* bits, said interface comprising:
   - a data register having first and second sections, said first section being in communication with the memory of said first processor for transferring therebetween in parallel a data word *m* bits or less in length, said second section being in communication with the memory of said second processor for transferring therebetween in parallel a data word *n* bits or less in length, independently of the transfer of a transfer of a data word to or from said first section, and
   - control means for serially shifting the contents of said first section into said second section at a selected bit position thereof and the contents of said second section at a selected bit position thereof and the contents of said second section into said first section at a selected bit position thereof whereby the effective lengths of the data words transferred between the two processor can be independently varied.

2. A digital communication interface as recited in claim 1 wherein said control means comprises:
   - first shift count means for counting the number of shifts of data in said first section of said data register and stopping the shifting of said data register at a first predetermined count to enable data to be transferred in parallel between said first section and said first processor,
   - first frame size register means for presetting said first shift count means with a first number corresponding to the size word to be transferred between said first section and said first processor each time said first shift count means counts to said first predetermined number,
   - second shift count means for counting the number of shifts of the data in said second section of said data register and stopping the shifting of said data register at a second predetermined count to enable data to be transferred in parallel between said second section and said second processor,
   - second frame size register means for presetting said second shift count means with a second number corresponding to the size of the word to be transferred between said second section and said second processor each time said second shift count means counts to said second predetermined number, and
   - logic means responsive to said first and second frame size registers for selecting the bit positions in said first and second sections of the data register into which data is shifted.

3. A digital communication interface as recited in claim 2 wherein said first and second predetermined counts are zero and wherein said first number is *m* or less and said second number is *n* or less.

4. A digital communication interface as recited in claim 2 wherein said first and second frame size register means are directly addressable by said first and second processors.

* * * * *